United States Patent [19]

Slonaker

[11] 3,859,070

[45] Jan. 7, 1975

[54] LAMINAR REFRACTORY STRUCTURES FOR FORMING GLASS FIBERS

[75] Inventor: Robert O. Slonaker, Pataskala, Ohio

[73] Assignee: Owens-Corning Fiberglas Corporation, Toledo, Ohio

[22] Filed: Oct. 23, 1973

[21] Appl. No.: 408,362

Related U.S. Application Data

[63] Continuation of Ser. No. 270,131, July 10, 1972, abandoned.

[52] U.S. Cl. ........................... 65/1, 65/374, 117/53, 117/105.2, 117/135.1
[51] Int. Cl. ........................................... C03b 37/02
[58] Field of Search ......... 65/1, 374; 117/53, 105.2, 117/135.1

[56] References Cited
UNITED STATES PATENTS

| | | | |
|---|---|---|---|
| 2,947,114 | 8/1960 | Hill | 65/374 X |
| 3,272,609 | 9/1966 | Benton | 65/1 |
| 3,294,503 | 12/1966 | Machlan et al. | 65/1 |
| 3,470,017 | 9/1962 | Rubin et al. | 117/105.2 |
| 3,685,978 | 8/1972 | Hansen et al. | 65/1 |

*Primary Examiner*—Robert L. Lindsay, Jr.
*Attorney, Agent, or Firm*—Carl G. Staelin; John W. Overman; Philip R. Cloutier

[57] ABSTRACT

Glass fiber forming apparatus adapted to receive and emit molten glass, which apparatus has a high density coating of a material not of the platinum group removably bonded to the sidewalls, the bottom wall and to tubular projections extending outwardly from the bottom wall, which coating is of sufficient thickness to retain oxides of the platinum group metals which form and migrate thereto from the apparatus during service at temperatures of molten glass, and which coating is capable of being removed after service for reclamation of the platinum group metals. The use of the apparatus is an improvement in the manufacture of glass fibers, in that very uniform fiber diameters are produced for extended periods of time by the maintenance of the apparatus in critical alignment with heat shielding members and further in that the life of the apparatus is extended.

19 Claims, 4 Drawing Figures

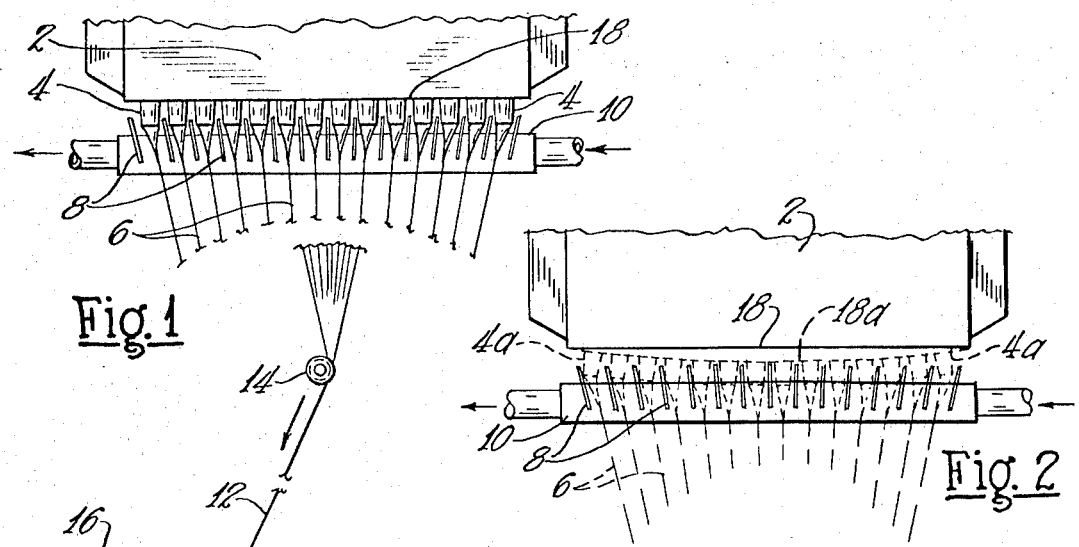
Fig.1
Fig.2
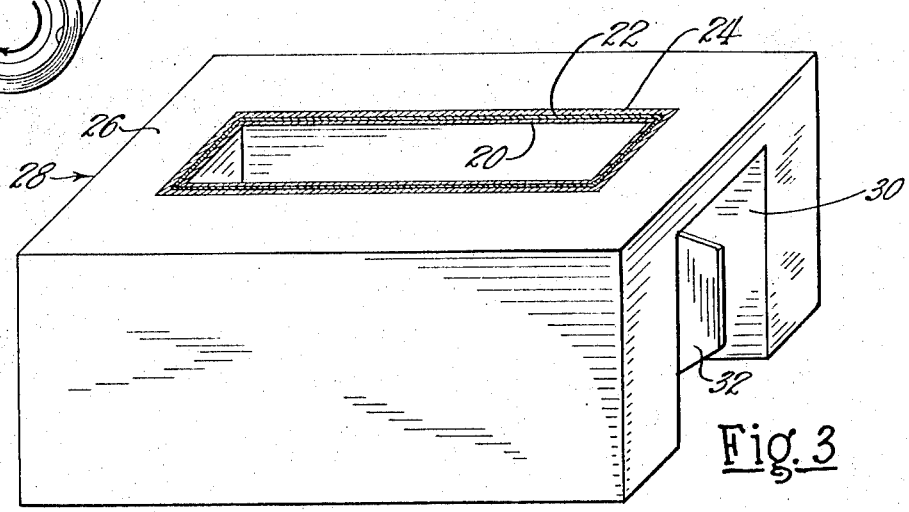
Fig.3
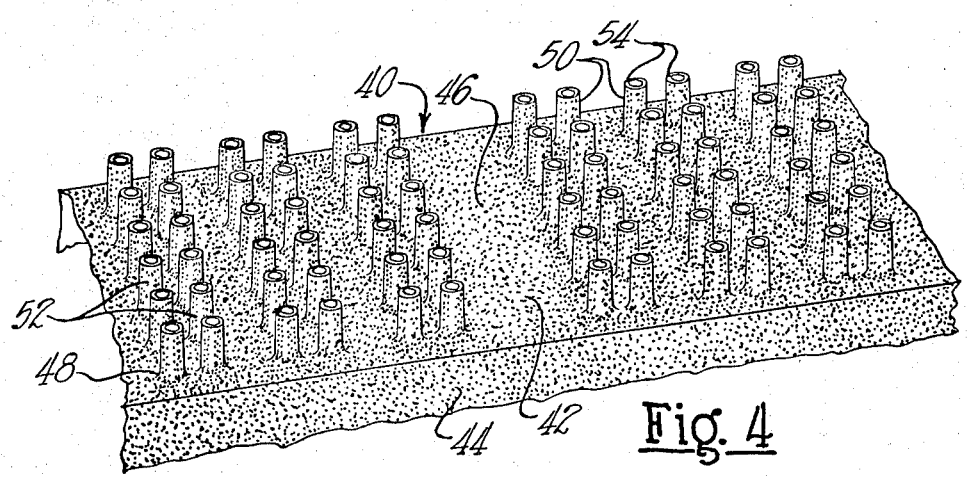
Fig.4

LAMINAR REFRACTORY STRUCTURES FOR FORMING GLASS FIBERS

This is a continuation of application Ser. No. 270,131, filed July 10, 1972, now abandoned.

BACKGROUND OF THE INVENTION

This invention relates to glass handling apparatus, comprising high density, high temperature coating bonded to precious metal alloy surfaces which are exposed to service temperatures of molten glass. The high density, high temperature coatings include refractory materials such as, magnesia, zirconia, alumina, titania, chromia, and combinations thereof which are particularly suited for preventing losses of precious metals from the alloys when fabricated into apparatus which is used in the production of glass fibers. Other suitable coatings which do not react with precious metals and which are stable to at least 3,000° F. may be used; these coatings include aluminides, silicides, beryllides, borides and combinations thereof. The coating is substantially non-porous or fused when combined with the fabricated apparatus. Furthermore, there may be multiple coatings applied to the apparatus.

Service conditions encountered in glass fiber-forming operations are varied and generally severe. A combination of exposure to corrosive molten glass and exposure to high temperatures up to 3,300° F. in an oxidizing atmosphere precludes the use of almost all alloy systems for use in glass handling apparatus.

Alloys comprising precious metals (platinum, iridium, rhodium, et al.) possess suitable characteristics for high temperature-high strength applications. However, even these alloys have measurable oxidation rates, thereby leading to losses in efficiency and economics. The oxides of precious metals volatilize upon formation causing considerable amounts of precious metal to be lost continuously in the glass fiber forming operation. Although there are reclamation processes to recover some of the oxidized precious metals, the processes require time thereby temporarily delaying the availability of the precious metal. Furthermore, there are non-recoverable losses which present economic as well as inventory problems for the fabricators of these articles.

When various alloy compositions are fabricated into glass handling apparatus and that apparatus is subsequently exposed to temperatures of molten glass during service, there have been in the past some problems experenced therewith.

Some of these problems include limitations on the operating temperatures at which the fabricated apparatus can be subjected, i.e., the oxidation losses are so rapid that they lead to the early degradation of the apparatus and furthermore account for an inefficient, non-uniform operation of the apparatus.

Another problem that fabricators and users of apparatus for handling molten glass have faced for many years is that of strength during service operations at high temperatures. The apparatus tends to creep, sag and buckle, during operation thereby adversely affecting the performance of the apparatus by changing the alignment of various interrelated parts. Specific reference is made to a bushing or feeder, used in the production of glass fibers. A bushing typically comprises a receptacle, capable of receiving and emitting molten glass, wherein its lower wall or bottom surface has a plurality of spaced openings or hollow members extending downwardly therefrom through which molten streams of glass emit for attenuation into glass fibers. Heat shielding members independently supported and aligned between the uniformly spaced openings or projections act as thermal barriers for environmental control. When misalignment of the tubular projections and the heat-shielding members occurs the efficiency of the apparatus is greatly decreased and the glass filaments tend to become non-uniform in diameter. Misalignment typically occurs when the bottom surface of a bushing begins to sag. The bushing sag may be temporarily compensated for by adjusting the shielding members, but a poor heat pattern develops thereby adversely affecting the quality of glass fibers being formed. During service of the bushing at temperatures of molten glass, a point is reached where adjustment of the heat-shileding members can no longer compensate for changes in the glass fiber diameters because of the degree of sagging in the tip section of the bushing. The outside tips become too hot causing the formed fibers to burn off prior to collection, i.e., their weight exceeds their tensile strength at that temperature. The central tips of the bushing, on the other hand, become too cold causing beading of the glass, thereby leading to the shutdown of the bushing because of extremely poor quality fibers and low efficiencies.

Another problem that users of apparatus for handling molten glass have faced for many years is that of trying to externally support the apparatus during operation in order to prevent sagging. When external supports are used, there is a problem of contamination of the alloy of the apparatus with the alloy of the support means. Additionally, these external support means, which contact the apparatus, rapidily conduct heat from the apparatus and disrupt the heat pattern. Still further these external support means electrically short the apparatus thereby leading to the shutdown of the apparatus and disruption in the manufacture of glass fibers.

Still another problem that exists for the users of fabricated articles comprising precious metals at high temperatures is the reclamation of the precious metals from castable refractory materials which surround the fabricated articles as a support and heat control means. Specific reference is made to a bushing as the fabricated article which is completely surrounded, except for its bottom surface, with a castable refractory material. When the bushing is not coated with a high density material of sufficient thickness as is taught by the instant invention, precious metal oxides form and migrate to the castable refractory material, thereby requiring costly and lengthy procedures to recover the precious metals therefrom after service of the bushing.

Prior to this invention any precious metal, such as for example, platinum, that migrated via oxidation and volatilization to the castable refractory material, employed to support the bushing structure and to minimize heat losses, would migrate or penetrate deeply therein, thereby requiring a lengthy and costly reclamation program. The castable material had to be ground into small pieces, ball milled, mineral jigged, and then processed on two consecutive vibrating table separators based on gravity-density differences. Two cycles of this reclamation process were required before the material that remained was sent to a smelter for further separation of the platinum from the refractory and refinement. From the time the castable refractory had been removed from the bushing structure for reclaiming the platinum, to the time most of the platinum was recovered, approximately 6 months elapsed. By the above described reclamation process, the platinum that was recovered was available for working or fabricating into a new bushing structure but because of the large time period required for the reclamation period, maintenance of higher platinum inventories were required whereas when laminar refractory structures are prepared according to the inventive concept, the castable refractory material is thrown away after service without it having had to be processed to recover any precious metals therefrom.

When a high density coating is applied to a bushing, it serves to prevent migration of precious metal oxides and also to help support the bushing while in service at high temperatures. For this reason the castable refractory material can be thrown away and the coating is simply stripped with an acid from the bushing and further dissolved in the acid. The acid used for stripping and dissolving is preferably the same acid used to flush out the glass from the bushing after service, including hydrofluoric acid, hydrochloric acid and combinations thereof. Subsequently, the metals are separated by gravity, ion exchange and filtration, in a relatively short time. Alternatively the high density coating may be stripped from the bushing by blasting with glass beads and then by dissolving in acid for further separation.

Apparatus, other than textile bushings, were also treated by exposing the surfaces to be coated to grit blasting at low pressures with a high purity abrasive, sufficient to obtain good bonding of the high density coating thereto. These included wool bushings, filter bushings, and bonded mat bushings used in the production of non-woven structures, comprising base metal alloys as well as precious metal alloys. Additionally, apparatus other than textile bushings also includes thermocouple protection tubes, level probes and other furnace hardware parts, external support means and cooling means such as heat-shielding members or fin shield assemblies used in association with textile bushings.

Oxidation losses from precious metal articles at high operating temperatures have been known and lived with for quite some time. Attempts have been made to limit these losses such as for example by slurry coating the articles with a material for protection against the elements. However, with these early attempts to protect articles made of precious metals, additional problems developed. One such problem was the difficulty in applying the coatings to the article in a uniform manner, thereby adversely affecting the efficiency of the treated article in service. The stability of these coatings was questionable because invariably, after only a short service time, crack propagation developed in the coatings. These coatings could not be fused or bonded to the article, but only deposited thereon, and the density thereof was not sufficient to act as a true barrier to the outward migration of precious metal oxides.

Other attempts at coating precious metal articles in the past include the extreme roughening of the surface to be coated, but these had drawbacks because too much precious metal was lost during the roughening operation, and on reclamation the coating was extremely difficult to remove because of its tenacious adherence to the roughened surface.

Still another attempt at protecting precious metal articles from oxidation attack at the high temperatures of molten glass included the bonding of a sub-coating to the articles prior to the adherence of a refractory coating, but this led to contamination of the platinum during reclamation.

When high density coatings are applied to fabricated articles by our method, all of the above problems are greatly reduced. In fact, there is a complete reclamation of the precious metals from the high density coating that migrated thereto during service, the time of reclamation is substantially shorter, and the process of reclamation is greatly simplified. In addition, there are benefits made possible that have not heretofore been possible when feeders or bushings are coated with a high density coating. These benefits include providing a capability to feeders to employ external support means to help prevent the feeders or bushings from sagging or buckling at temperatures of molten glass and/or to help provide a degree of flexibility in altering the heat pattern of the feeder.

SUMMARY OF THE INVENTION

A refractory material comprising $MgO$, $ZrO_2$, $Al_2O_3$, $TiO_2$, $Cr_2O_3$ and combinations thereof or other suitable material including aluminides, silicides, borides, and combinations thereof and a method for applying the material to articles fabricated from precious metals is provided so that a laminate structure is obtained to preclude oxidation losses of the precious metals during service at the high operating temperatures of molten glass, thereby improving the life of the fabricated articles, and further, improving the process for the manufacture of glass fibers.

Advantages of the instant invention in addition to the prevention of losses of precious metals include: an improvement in the structural stability of the fabricated articles at high temperatures; a low permeability barrier provided by the coating which eliminates the reclamation process of the castable refractory above described, by inhibiting the outward migration of precious metals through oxidation; a coating which has good bonding characteristics but which is easily removed subsequent to operation, thereby allowing the precious metal article itself to be easily reclaimed so that a reduction in fabrication costs results; an improved refractory structure is obtained by maintaining temperature uniformity throughout the structure; higher operating temperatures to approximately 3,300° F. can be employed thereby allowing cheaper glass compositions to be used to form glass fibers; and the thickness of the sidewalls and the bottom wall of the bushing can be reduced because of the mechanical support offered by the high density coating to prevent sag.

Other advantages of the instant invention in addition to the advantages mentioned above include providing the feeder with a capability to use external support means, especially for the bottom wall of the feeder. The high density coating on the precious metal feeder allows an external support means, which is usually fabricated from a base metal, to be placed in contact with the composite or laminate feeder without contamination of the precious metal by the base metal. This contamination causes non-uniform heat patterns and reduction in the life of the feeder. By covering the external support means with a high density refractory coating, such as magnesium zirconate, there is provided a double refractory diffusion barrier to the contamination of metals which has point contact rather than surface contact. Additionally, the high density, high emissivity refractory material coating on the external support means acts as an insulator thereby eliminating the possibility of electric short-circuiting of the feeder by the external support means. There are instances when it is desirable to coat the external support means with a low emissivity coating, such as a platinum coating in order to affect or vary the efficiency of the external support means as a heat-sink. The entire support means may be covered or only portions thereof, especially those portions in close proximity to or in contact with the feeder.

Ancillary advantages that arise by using and applying coatings according to the instant invention, but not to be overlooked, include an effective reduction in the precious metal inventories, an increase in available fabricated articles assuming a constant inventory, and a great economic savings without impairing but in fact improving, performance of the fabricated articles.

It has also been observed that more uniform glass fibers are obtained over a longer period of time because the composite bushing of this invention resists sagging, so that the holes or tubular projections of the bushing do not become misaligned with heat-shielding members. This is extremely critical. Misalignment causes non-uniform cooling of the molten streams of glass thereby varyingly affecting the diameter of the formed filaments during attenuation. Additionally, because of the high density coating on the bottom wall and on the tubular projections projecting downwardly from the bottom wall of a feeder, the heat-shielding members may be used to physically support the feeder in order to help maintain the critical alignment between the tubular projections and the heat shielding members. This type of physical support has not been possible prior to this invention because of the problem of contaminating the precious metal of the feeder with the support, which is usually fabricated from a base metal. Still further, the environment in the immediate proximity to the tubular projections of the feeder, where molten glass emits therefrom for attenuation into glass fibers, may be altered to a greater degree than heretofore possible by coating portions of or the entire support with different materials.

Because oxidation losses of precious metals have long been a problem with fabricated articles used at high service temperatures, theories have been propounded as to how these oxidation losses occur and how they may be reduced. Fryburg presented the "Boundary Layer Diffusion" theory of platinum oxidation in 1965. (Fryburg, "The Pressure Dependency in the Oxidation of Platinum by a Boundary-layer Diffusion Mechanism," Transactions of AIME, Vol. 233, November, 1965.) This theory has gained wide acceptance, particularly in the temperature range of 1,800° F. - 3,300° F. The theory is equally applicable to platinum, rhodium, or their binary alloys. The mechanism of formation of the oxides is the same for all alloys. Fryburg stated that the precious metal surface is surrounded by a finite volume, termed a boundary layer, which can be viewed as a layer of static atmosphere. When a precious metal oxide forms on the alloy surface, it immediately volatilizes and diffuses to the outer edge of the boundary layer to be carried away by moving atmosphere. However, it is thought that within the boundary layer, escaping oxide molecules collide with other molecules and in many instances are back-directed to the alloy surface. The rate of oxide loss is governed by this phenomenon. Therefore, any action taken to saturate or densify the boundary layer, to provide more collision sites, will help to reduce the net diffusion through this layer thereby decreasing oxidation losses. Through the application of a high density coating of sufficient thickness onto the alloy surface, this saturation is provided with an effectiveness proportional to the coating density and thickness.

When the fabricated article is a bushing or feeder, comprising a body, tip section and rows of tips for use in the production of glass fibers, another benefit arises when high density coatings are applied to the tip section and to the tubular projections of a bushing, which is exposed to rapid atmospheric flow. It is known that an increase in system flow-by will decrease the thickness of the boundary layer thereby decreasing the number of available collision sites. It follows then that oxidation losses will increase because the distance each molecule must travel through the boundary layer becomes shorter and the probability of collision lower, unless a stable high density coating is provided to increase the density of collision sites within the boundary layer.

When refractory or other coatings are applied to the alloy surface via high temperature spraying, there is thought to be provided a static layer independent of system flow. The resulting composition inhibits oxidation losses, probably because of the high density of the coating, and actually aids in the reduction of sag while in service, i.e., the composite is stronger. Our high density-high temperature coatings are fused onto the alloy surface at a temperature greatly in excess of the temperature at which the laminate will be exposed.

The stability of high temperature materials has, however, been a problem in the past. Former attempts at coating an alloy surface, particularly a feeder, with such a material led to the cracking of the coating during operation at the high temperatures of molten glass, thereby reducing its effectiveness as a barrier and permitting an exit for volatile oxides. By using standard flame spray or plasma spray equipment and selecting a coating or combination of coatings which do not contaminate the feeder and which has a coefficient of expansion from $0.5 - 4.0 \times 10^{-6}$ inches/inch° C. lower than the alloy to be coated, not only does the stability of the coating improve, but the composite structure is stronger.

In view of the foregoing it is an object of the present invention to provide a more efficient, more economically operable apparatus for fiber forming operations wherein fibers are attenuated from thermoplastic materials supplied from orificed feeders or bushings.

It is another object of the present invention to provide an improved means for the production of continuous glass fibers wherein a high density coating is removably attached to orificed feeders or bushings.

It is yet another object of the present invention to provide an improved means for the production of continuous glass fibers wherein the high density coatings serves to prevent oxidation losses of precious metal oxides during the service of the feeders or bushings and is easily removable in subsequent operations so that precious metals that have migrated thereto may be reclaimed.

Additionally, it is an object of the present invention to provide a glass fiber forming apparatus adapted to withstand the tendency to sag or buckle while exposed to temperatures of molten glass during service.

Still further, it is another object of the present invention to provide the capability to a glass fiber forming apparatus to be supported via external means and/or to alter the environment immediately surrounding the glass fiber forming apparatus.

In carrying out the above objects there is illustrated herein apparatus for producing a plurality of filaments of heat softenable material comprising: a feeder for feeding such material in molten form to orifices from which streams of the material flow; a high density coating capable of retaining volatile precious metal oxides therein; material for insulation and expansion of the bushing during services; and an outer refractory casing.

The coating for retaining volatile oxides may be composed of any material capable of withstanding extremely high temperatures and which is easily removable from the feeder so that reclamation of the metals from their oxides may be accomplished.

Also illustrated herein is apparatus for producing a plurality of filaments of heat softenable material wherein the apparatus has not been treated in accordance with the inventive concepts, so that a better understanding of the problems involved may be realized.

Other objects, advantages and features will become apparent when the following description is taken in conjunction with the accompanying drawings, in which:

FIG. 1 is an elevational view of a newly installed feeder in operation, in an aligned relationship to a heat-shielding assembly, wherein the feeder is not treated in accordance with the concepts of this invention;

FIG. 2 is an elevational view of a feeder in operation, after considerable service time, in a misaligned relationship to a heat-shielding assembly, wherein the feeder is not treated in accordance with the concepts of this invention;

FIG. 3 is a perspective view looking down on a bushing assembly prepared in accordance with the principles of the present invention;

FIG. 4 is a perspective view looking down on a bushing having a high density coating on the sidewalls, the bottom wall and the tubular projections extending outwardly from the bottom wall.

Referring now to the drawings, FIG. 1 shows a fabricated feeder or bushing in its original operating position wherein perfect alignment between the tubular projections and the shielding members prevails.

The bushing structure 2 has tips or tubular projections 4 extending outwardly from the bottom surface 18 of the bushing structure. The tubular projections are aligned in such a manner that filaments of molten glass 6 pass equidistant between fin shields 8 uniformly mounted on a header or manifold 10 through which a coolant is passed. The filaments are sized with a protective material, gathered into a strand 12 via a gathering device such as a grooved roller 14 and subsequently wound onto a package.

Because of the high temperature required in the formation of glass filaments from molten glass, and because of the stress upon the bottom surface 18 of the bushing structure 2 during the formation of glass filaments, sagging of the bottom surface 18a occurs as illustrated in FIG. 2, which bushing is not treated in accordance with the concepts of this invention. Sagging of the bottom wall of the bushing leads to the misalignment of the tubular projections 4a with the fin shields 8 which in turn causes breakouts of the forming filaments 6 and the eventual shutdown of the bushing structure. However, before the shutdown of the bushing structure, there is a period when non-uniform diameter filaments are produced, thereby leading to quality-control problems.

When the bushing structure is treated according to the concepts of this invention however, as depicted in FIGS. 3 and 4, the problems of sagging, misalignment and non-uniformity of fiber diameter are substantially eliminated.

Referring to FIG. 3, bushing 20 has a high density coating 22 on its exterior surfaces including the bottom surface or tip plate and further on tubular projections projecting outwardly therefrom, from which molten streams of glass emit in the form of filaments. Disposed about the coating on the sidewalls of the bushing, and in a touching relationship, therewith, except for the bottom surface and the projections of the bushing, is a high temperature fibrous material 24 used to insulate and allow for expansion of the bushing during service, and which material facilitates removal of a disposable castable refractory material 26 after the bushing has completed its use in service.

During service at temperatures of molten glass, the laminate structure 28 shows a remarkable increase in its resistance to sagging in addition to other properties heretofore discussed. A relief 30 in the castable refractory material 26 is provided so that a terminal 32 connected to the bushing, has sufficient room to receive an electrical connection in order to supply and maintain heat to the bushing for melting the glass therein.

Referring to FIG. 4, the bushing 40 is shown with a high density coating 42 which covers the bushing sidewalls 44 and the entire bottom surface 46 of the bushing, including the base portions 48 and the sidewalls 50 of the tubular projections 52 extending outwardly from the bottom wall 46. The edges 54 or surfaces which define the orifices of the projections 52 are shown without the high density coating and possess a machined finish.

The inside of the bushing may also be coated with a material which is resistant to glass attack to further strengthen the structure and to prevent oxidation losses of precious metals from the bushing into the molten glass, thereby increasing bushing life.

The term "bushing life" refers to the life of a bushing during service at the high operating temperatures of molten glass. Normal imperfections during fabrication, such as non-uniform cross-section in a precious metal sheet, produce localized heat or thermal concentrations due to high current in the areas of lesser cross-section. The bushing itself is looked at and is considered as an electrical heating element. Oxidation and volatilization losses will occur more readily in these areas of high current density. These cross-sectional areas are further thinned by volatilization losses, thereby further increasing current density. This condition accelerates until an actual burn-through or melting of the metal occurs, causing failure of the bushing. This is especially critical in weld-zones, where two or more sheets of metal are joined in the fabrication of a bushing, because the metal is thinned by welding. Our high density coatings and method of applying the coatings retards further degradation of the bushing through volatilization losses thereby extending bushing life, without adversely affecting other desirable properties.

Selection of a high density coating having a coefficient of thermal expansion less than the coefficient of thermal expansion of the fabricated article to be coated, plays an important role in strengthening the bushing. It is surmised that by applying such a coating to the article, for example, to the tip-section and/or the sidewalls of a bushing, the coating imparts a slight arch, inwardly, thereby serving to strengthen the structure. The arch, no matter how slight, serves as any other arch, that is, compressive forces are exerted on the tip section to help prevent sagging thereof during operation. In some operations it is feasible to reduce the thickness of the alloy structures because of the increased strength provided by the coating.

Depending upon the operating temperatures of the glass handling apparatus during service, the composition of the coating may be altered to provide greater or lesser differences in the coefficients of expansion between the coating and the article to be coated. Also, the thickness of the high density coating is a function of the temperature and the intended application of the treated article, but the thickness must be sufficient to provide a capability to the coating to collect and prevent the outward migration of precious metal oxides that volatilize from the bushing at high temperatures.

It is theorized that a synergistic effect occurs when a high density coating, which is brittle, is bonded to a precious metal alloy, which is ductile, to produce a laminate possessing properties not possessed singularly by the refractory nor the alloy.

It is further thought that full or complete coverage of the exposed surfaces of the feeder with a high density coating, except for those surfaces which define the orifices of the tubular projections, maximizes compressive forces thereon and minimizes volatilization losses of precious metal oxides from the feeder.

It had been thought in the past that the sidewalls of the tips on the bottom wall of a feeder should remain free from foreign material during the manufacture of glass fibers, and that the precious metal surfaces thereof should not be disturbed in any other manner, such as by roughening, in order to prevent a condition known as "flooding" from occurring. Flooding is defined as the covering or wetting of a substrate, such as the tip side walls and/or the tip plate of a bushing with molten glass which disrupts the formation of glass fibers. For these reasons, the tips or substantially the entire length of the tips and portions of the bottom wall were protected during the grit blasting and flame spraying operations.

It has now been found that the high density coating may cover the entire sidewall of the tips and extend all the way to that surface which defines the orifice of the tips without inducing a flooding condition. Furthermore, the complete coverage of the tips with the coating substantially reduces volatilization losses which before were unrecoverable. Additionally, the full coverage of the tip plate with the high density coating, including the bottom wall and tips, provides the feeder or bushing with a capability of being supported by external means. In the past, when a bushing or feeder was prepared for receiving a coating of a high density material and was then covered with the high density coating, special emphasis was concentrated on protecting the tips of the bushing. The tips of a bushing have polished surfaces wherein a predetermined "contact angle" is established. Contact angle is defined as $2 \tan^{-1} x^h$, wherein $h$ is the height of a molten bubble of glass on a particular substrate and $x$ is the radius of the base of the bubble. When a constructed tip on the tip plate is altered such as by roughening the surface via grit blasting or by covering the same with a refractory having a lower contact angle, the predetermined contact angle is adversely affected, and a condition known as flooding occurs. As the contact angle decreases, i.e. approaches zero degrees, the tendency toward flooding increases, which inhibits the formation of glass fibers. Surface conditions, temperature, the particular alloy and specific glass compositions are among the factors to be considered when establishing the contact angle. Generally, when the surface of a particular substrate is rough, its resistance to flooding or wetting is low. Also, when a rough, as compared to a smooth surface floods, it is more difficult to clean, therefore a relatively smooth surface is desired.

When, as in the past, the tips of a bushing were protected from grit blasting and from flame spraying in order to preserve the predetermined contact angle, portions of the tips, especially the sidewalls thereof, and portions of the tip plate or bottom wall, were not covered with the high density coating because of covers or chemical coatings that physically prevented coating the protected portions. This means that those portions of the tips, and in some cases portions of the bottom wall and bases of the tips, which were not covered with the high density coating, were subject to losses of precious metal through volatilization.

A new and improved method for preparing the bushing for receiving a thermally sprayed material has been found, which method improves the life of the bushing, and the treated bushing of this invention is an improvement in the manufacture of uniform diameter glass fibers over extended periods of time.

Upon thermally spraying an article roughened by grit blasting, such as a precious metal bushing, the particles that emit from the spray gun are melted on their way to the article, and travel at very high velocities so that on impact with the article there is plastic deformation of the particles around the roughened surface. Friction bonding or mechanical bonding occurs wherein the particles become oblong and non-uniform in character, and the result is a film rougher than the roughened surface of the article. The film, through the action of heat and velocity, is of high density, whereas with slurry or brush coating, the material is much less dense and is not bonded to the roughened alloy surface. Thermal spraying is accomplished by conventional plasma spray or flame spray techniques.

The new method for forming the composite bushing comprises fabrication of the entire bushing or fabrication of at least the tip plate which includes the bottom wall and tips extending outwardly therefrom, from a precious metal alloy. Without protecting the tips, which have not been polished, the entire bushing or tip plate is roughened by grit blasting with pure alumina grit (40–80 mesh) at a pressure of about 50–60 psi, to a degree sufficient to physically hold the high density coating thereon during service of the composite bushing at temperatures of molten glass, but insufficient to prevent removal of the high density coating by standard techniques, such as with acid. Subsequent to roughening the surfaces, the entire bushing or tip plate is then flame-sprayed with a material such as magnesium zirconate or a silicide with a METCO thermospray gun to produce a high density coating. When the tip plate instead of the entire bushing is prepared and coated, it is fully covered with the high density coating except for an outer perimeter of about ¼ inch so that the tip plate can be welded to the sidewalls to complete the fabrication of the bushing. The ends of the tips are then rubbed with a soap stone in order to break up and remove any material that may have adhered to that surface which defines the orifice of the tips. Glass beads are blasted at the back side of the tip plate in order to remove any adherent coating from the inside of the tips. On occasion, a reamer may be required to remove or unplug the orifices of the tips. The surfaces, which define the orifices of the tips, are ground and polished to the required specifications in order to obtain the desired predetermined contact angle of molten glass with the surfaces.

The coated bushing when treated by the above described procedure was then placed into position to receive molten glass for the formation of glass fibers at service temperatures of approximately 2,950° F. and was surrounded by a disposable, castable refractory material. After removal of the composite structure from the fiber forming operation, the disposable refractory material was discarded without reclamation and the high density coating was stripped from the laminate structure and dissolved in about a 70 percent hydrofluoric acid solution in 40–48 hours. The high density coating showed good bond quality, excellent durability under high temperature service conditions and good thermal stability. The high density coating, after having been stripped from the laminate structure, was easy to grind prior to being treated with acid, and any platinum that had migrated thereto via oxidation was separated and recovered. Alloy losses due to grit blasting were held to approximately 0.01 percent of total weight and were directly recoverable. This was 10 times less than the daily operating losses of an apparatus without a high density coating.

I claim:

1. A glass fiber forming apparatus adapted to hold and emit molten glass for attenuation into glass fibers, said apparatus being fabricated from a platinum group metal alloy and said apparatus comprising:
   a. Sidewalls and a bottom wall,
   b. a plurality of rows of tubular projections extending downwardly from the bottom wall, and
   c. a high density coating of a material not of the platinum group removably bonded to the sidewalls, to the bottom wall and to the tubular projections of the apparatus to form a composite, said coating having a sufficient density and thickness to preclude the migration of volatile oxides of the platinum group metal from the apparatus during service of the apparatus at temperatures of molten glass, said coating retaining the oxides of the platinum group therein so that the platinum group metal can be reclaimed subsequent to the service of the apparatus, said coating resisting deterioration at temperatures of molten glass, and said coating having a coefficient of thermal expansion substantially lower than the coefficient of thermal expansion of the alloy in order to impart compressive forces to the sidewalls and the bottom wall to help support and maintain the apparatus in a dimensionally stable condition during operation at temperatures of molten glass, and to help maintain the alignment of the tubular projections during operation of the apparatus at temperatures of molten glass so that uniformity of glass fiber diameter is maintained.

2. The glass fiber forming apparatus as claimed in claim 1 wherein the entire surface of the tubular projections, except for that surface of the tubular projections which defines the orifice thereof, has the high density coating removably bonded thereto.

3. The glass fiber forming apparatus as claimed in claim 1 wherein the sidewalls, bottom wall and outer surfaces of the tubular projections have roughened surfaces sufficient to physically hold the high density coating during service of the apparatus at temperatures of molten glass, but insufficient to conventionally remove the high density coating after service so that the platinum metal can be reclaimed from the high density coating.

4. The glass fiber forming apparatus as claimed in claim 1 wherein the high density coating is selected from the group consisting of magnesia, zirconia, alumina, titania, chromia, aluminide, silicide, beryllides, boride and combinations thereof, and wherein the high density coating has a thickness of from 0.002 to about 0.030 inches.

5. The glass fiber forming apparatus as claimed in claim 1, wherein the high density coating is magnesium zirconate.

6. The glass fiber forming apparatus as claimed in claim 1, wherein the coefficient of thermal expansion of the high density coating is from $0.5 - 4.0 \times 10^{-6}$ inches/inch° C. lower than the coefficient of thermal expansion of the alloy.

7. A method for producing a composite refractory-platinum group metal alloy glass fiber forming apparatus, wherein said apparatus comprises a container having sidewalls, a bottom wall and a plurality of rows of hollow projections extending outwardly from the bottom wall, and a high density coating of a material not of the platinum group removably bonded to the container and to the hollow projections of the apparatus to form a composite, wherein said method comprises the steps of:
   a. roughening the outer surfaces of the apparatus to a degree sufficient only to physically hold the high density coating thereon during service of the composite apparatus at temperatures of molten glass,
   b. flame spraying on the roughened surfaces of the apparatus with a refractory material not of the platinum group to produce a high density coating, said coating having sufficient density and thickness to preclude outward migrations of volatile oxides of platinum group metals from the apparatus during service of the apparatus at temperatures of molten glass and said coating retaining the oxides of the platinum group therein so that the platinum group metals can be reclaimed subsequent to service of the apparatus, and
   c. rubbing, grinding and polishing the surfaces which define the orifices of the hollow projections in order to break up and remove any material that may have adhered to the surfaces which define the orifices of the projections and to obtain desired contact angles of molten glass with the surfaces.

8. The method as claimed in claim 7, wherein the bottom wall is subjected to roughening and flame-spraying, except for an outer perimeter of the bottom wall of about ¼ inch, prior to welding the bottom wall to the sidewalls of the apparatus, which sidewalls have previously been coated with a refractory material not of the platinum group.

9. The method as claimed in claim 7, further comprising roughening the outer surfaces of the apparatus with pure alumina grit of about 40–80 mesh at a pressure of about 50–60 psi.

10. The method as claimed in claim 7, further comprising blasting glass beads at the interior of the apparatus in order to remove any adherent coating from the interior of the hollow projections.

11. A method for producing a composite refractory-platinum group metal alloy glass fiber forming apparatus, wherein said apparatus comprises a container having at least one wall, said wall having at least one orifice therein, and wherein said apparatus further comprises a high density coating of a refractory material not of the platinum group removably bonded thereto to form a composite, wherein said method comprises the steps of: (a) roughening the outer surfaces of the apparatus to a degree sufficient only to physically hold the high density coating thereon during service of the composite apparatus at temperatures of molten glass; (b) flame spraying the roughened surfaces of the apparatus with a refractory material not of the platinum group to produce a high density coating, said coating having sufficient density and thickness to preclude outward migrations of volatile oxides of platinum group metals from the apparatus during service of the apparatus at temperatures of molten glass and said coating retaining the oxides of the platinum group therein so that the platinum group metals can be reclaimed subsequent to service of the apparatus; and, (c) rubbing, grinding and polishing the immediately adjacent surface regions which define the orifice in order to break up and remove any refractory material that may have adhered to the surface regions.

12. The method as claimed in claim 11 wherein the bottom wall is subjected to roughening and flame-spraying except for an outer perimeter of the bottom wall of about ¼ inch, prior to welding the bottom wall to the sidewalls of the apparatus, which sidewalls have previously been coated with a refractory material not of the platinum group.

13. The method as claimed in claim 11, further comprising roughening the outer surfaces of the apparatus with pure alumina grit of about 40–80 mesh at a pressure of about 50–60 psi.

14. The method as claimed in claim 11, further comprising blasting glass beads at the interior of the apparatus in order to remove any adherent coating from the interior of the apparatus.

15. A glass fiber forming apparatus adapted to hold and emit molten glass for attenuation into glass fibers, said apparatus being fabricated from a platinum group metal alloy, and said apparatus comprising:
 a. a container including orifice outlet surface regions, and
 b. a high density coating of a material not of the platinum group removably bonded to the exterior surfaces of the container to form a composite,
said coating having a sufficient density and thickness to preclude the migration of volatile oxides of the platinum group metal from the apparatus during service of the apparatus at temperatures of molten glass, said coating retaining the oxides of the platinum group therein so that the platinum group metal can be reclaimed subsequent to the service of the apparatus, said coating resisting deterioration at temperatures of molten glass, and said coating having a coefficient of thermal expansion substantially lower than the coefficient of thermal expansion of the alloy in order to impart compressive forces to the sidewalls and the bottom wall to help support and maintain the apparatus in a dimensionally stable condition during operation at temperatures of molten glass.

16. The glass fiber forming apparatus as claimed in claim 15 wherein the container has roughened surfaces sufficient to physically hold the high density coating during service of the apparatus at temperatures of molten glass, but insufficient to conventionally remove the high density coating after service so that the platinum metal can be reclaimed from the high density coating.

17. The glass fiber forming apparatus as claimed in claim 15 wherein the high density coating is selected from the group consisting of magnesia, zirconia, alumina, titania, chromia, aluminide, silicide, beryllide, boride and combinations thereof, and wherein the high density coating has a thickness of from 0.002 to about 0.030 inches.

18. The glass fiber forming apparatus as claimed in claim 15, wherein the high density coating is magnesium zirconate.

19. The glass fiber forming apparatus as claimed in claim 15, wherein the coefficient of thermal expansion of the high density coating is from $0.5 - 4.0 \times 10^{-6}$ inches/inch °C. lower than the coefficient of thermal expansion of the alloy.

* * * * *